United States Patent
Kim et al.

(10) Patent No.: US 7,847,451 B2
(45) Date of Patent: Dec. 7, 2010

(54) SPINDLE MOTOR

(75) Inventors: Euihyun Kim, Suwon (KR); IInam Kang, Inchon (KR)

(73) Assignee: Samhongsa Co., Ltd., Seoul (KR)

( * ) Notice: Subject to any disclaimer, the term of this patent is extended or adjusted under 35 U.S.C. 154(b) by 0 days.

(21) Appl. No.: 12/273,607

(22) Filed: Nov. 19, 2008

(65) Prior Publication Data

US 2009/0127947 A1     May 21, 2009

(30) Foreign Application Priority Data

Nov. 19, 2007   (KR) .................. 10-2007-0117643

(51) Int. Cl.
*H02K 5/00* (2006.01)
*H02K 11/00* (2006.01)

(52) U.S. Cl. .................. 310/90; 310/66; 310/67 R

(58) Field of Classification Search .............. 310/90, 310/67 R, 66; 384/276; 416/432.12
See application file for complete search history.

(56) References Cited

U.S. PATENT DOCUMENTS

| 4,955,791 | A  | * | 9/1990 | Wrobel | 417/354 |
| 7,015,610 | B2 | * | 3/2006 | Horng et al. | 310/90 |
| 2003/0113045 | A1 | * | 6/2003 | Fujinaka | 384/100 |
| 2007/0013246 | A1 | * | 1/2007 | Hong et al. | 310/90 |
| 2007/0024137 | A1 | * | 2/2007 | Otsuki et al. | 310/90 |
| 2007/0071374 | A1 |   | 3/2007 | Hong et al. | |
| 2007/0176504 | A1 | * | 8/2007 | Otsuki et al. | 310/90 |
| 2007/0194644 | A1 | * | 8/2007 | Kanatani et al. | 310/90 |

FOREIGN PATENT DOCUMENTS

| DE | 3339710 A1 | * | 5/1985 |
| JP | 2001-286093 | | 10/2001 |
| KR | 10-2005-0066023 | | 6/2005 |

OTHER PUBLICATIONS

Machine Translation DE3339710 (1985).*

* cited by examiner

*Primary Examiner*—Quyen Leung
*Assistant Examiner*—Jose A Gonzalez Quinones
(74) *Attorney, Agent, or Firm*—Stein McEwen, LLP

(57) ABSTRACT

Provided is a spindle motor on which an optical disc is put, rotated and operated. The spindle motor includes a rotor, a stator, a stop washer, and a cap. The cap is put on a thrust supporter that supports a rotation shaft of the rotor, and the cap is pressed into a bearing housing and is closely attached to the bearing housing so that the cap can be easily, closely attached to the bearing housing and due to a press fit force, the cap can be coupled to the bearing housing without formation of a gap between the bearing and the bearing housing and leakage of oil can be prevented, and a press fit force of the bearing and a press fit force of the cap itself act on the cap so that the cap can be prevented from upward separation from the bearing housing.

6 Claims, 4 Drawing Sheets

SPINDLE MOTOR

CROSS-REFERENCE TO RELATED PATENT APPLICATION

This application claims the benefit under 35 U.S.C. §119 (a) from Korean Patent Application No. 10-2007-0117643 filed Nov. 19, 2007 in the Korean Intellectual Property Office, the disclosure of which is incorporated herein by reference.

BACKGROUND OF THE INVENTION

1. Field of the Invention

The present invention relates to a spindle motor on which an optical disc is put, rotated and operated, and more particularly, to a spindle motor in which a shape of a cap supporting an end of a rotation shaft of a rotor of the spindle motor and a shape of a bearing housing that is closely attached to the cap are improved so that the cap can be prevented from being separated from the bearing housing, the cap can be easily pressed into the bearing housing and can be easily closely attached thereto and leakage of oil can be prevented.

2. Description of the Related Art

A conventional spindle motor illustrated in FIG. 3 is used in the field of spindle motors for rotating an optical disc, which are used in optical disc devices, such as minidiscs (MD), etc. The conventional spindle motor for rotating the optical disc illustrated in FIG. 3 includes a rotor R and a stator S.

The rotor R includes a magnet 101, a rotor yoke 102, a rotation shaft 103, and a turntable 104. The stator S includes a bearing 105, a bearing housing 106 that fixes the bearing 105, a thrust supporter 107 that supports a front end of the rotation shaft 103 in a direction of thrust, an insulated core 109, a winding 108, a substrate 110, and a base plate 112.

When a disc (for example, a MD) is loaded into the turntable 104 of the spindle motor, an optical disc is put on the turntable 104. When the optical disc is ejected from the turntable 104, the optical disc is separated from the turntable 104. In this way, the optical disc can be detached from the turntable 104. Thus, a tool that is used to prevent the rotor R from escaping from the stator S in an axial direction, is needed.

In the conventional spindle motor illustrated in FIG. 3, the rotation shaft 103 of the rotor R is inserted in the bearing 105 of the stator S, and the front end of the rotation shaft 103 is supported by the thrust supporter 107, and the thrust supporter 107 is attached to the bearing housing 106 in a calking manner, and the thrust supporter 107 is coupled to the bearing housing 106 so that the thrust supporter 107 cannot be separated from the bearing housing 106.

However, since the thrust supporter 107 and the bearing housing 106 are attached to each other only in the calking manner, a thrust attracting force of the thrust supporter 107 that acts on the rotation shaft 103 when the spindle motor operates is larger than a press fitting force that is used to attach the thrust supporter 107 to the bearing housing 106 in the calking manner. Thus, the thrust supporter 107 is often separated from the bearing housing 106, and due to a weak close-fixing force of the thrust supporter 107, oil leaks through the bearing 105.

Meanwhile, Korean Patent Laid-open Publication No. 10-2005-0066023 discloses a spindle motor so as to solve a problem that a thrust supporter is separated from a bearing housing. That is, as illustrated in FIG. 4, a bearing housing 20 is installed on a plate 111, and a bearing 30 that supports the rotation shaft 40 is pressed into an inner circumferential surface of the bearing housing 20, and a core 70 is fit to an outer circumferential surface of the bearing housing 20, and a coil 80 is wound around the core 70. A rotor yoke 50 is fixed on the rotation shaft 40 and is apart from the core 70 by a predetermined distance, and a magnet 60 faces the core 70 on an inner circumferential surface of the rotor yoke 50. In addition, a turntable 90 is secured to a top end of the rotation shaft 40, and a thrust supporter 150 is in contact with a bottom end of the rotation shaft 40, and a cap 120 is disposed on the thrust supporter 150 when the thrust supporter 150 is accommodated in the cap 120, and the cap 120 prevents thrust supporter 150 from being separated from the bearing housing 20.

However, in the spindle motor disclosed in Korean Patent Laid-open Publication No. 10-2005-0066023, in which the cap 120 is disposed on the thrust supporter 150 so as to prevent the thrust supporter 150 from being separated from the bearing housing 20, due to a thrust attracting force, the cap 120 may be separated from the bearing housing 20 together with the thrust supporter 150, and due to a weak, close-fixing force of the cap 120, oil may leak through the bearing 30.

SUMMARY OF THE INVENTION

The present invention provides a spindle motor in which a cap is put on a thrust supporter supporting a rotation shaft of a rotor and the cap is pressed into a bearing housing and is closely contacted to the bearing housing so that the cap and the bearing housing can be easily, closely attached to each other and can be assembled to each other without a gap between a bearing and the bearing housing by a press fit force and leakage of oil can be prevented and both a press fit force of the bearing that is closely attached to a top surface of the cap and a press fit force of the cap itself act so that the cap can be prevented from being upwardly separated from the bearing housing.

The present invention also provides a spindle motor in which a cap has an outer diameter including a large diameter portion and a small diameter portion and the large diameter portion and the small diameter portion are pressed into a stepped part that is formed in an inner circumferential surface of a bearing housing and are closely attached to each other and the cap is hung on the stepped part so that the cap can be prevented from being downwardly separated from the bearing housing when a rotation shaft escapes from a stator downward.

The present invention also provides a spindle motor in which a second stepped part is formed on an upper side of the first stepped part of the bearing housing and when a cap is pressed into the bearing housing, due to the second stepped parts, an outer circumferential surface of the cap does not contact an inner circumferential surface of the bearing housing so that a change of an inner diameter of the bearing housing can be inhibited and damage of the inner circumferential surface of the bearing housing can be prevented.

According to an aspect of the present invention, there is provided a spindle motor, the spindle motor including: a rotor comprising a rotation shaft which includes a reduced-diameter portion formed on an end of the rotation shaft being located at a center of said rotor; a stator comprising a radial bearing supporting the rotation shaft, a bearing housing surrounding the radial bearing, and a thrust supporter supporting a bottom end of the rotation shaft, said stator supporting said rotor to be rotatable with the rotation shaft; a cap tightly fitted on a lower portion of the bearing housing; and a stop washer engaging the reduced-diameter portion of the rotation shaft of said rotor, of which top surface is closely contacted to a bottom surface of the bearing and of which bottom surface is closely contacted to a top surface of said cap so that the rotation shaft of said rotor inserted in said stator does not escape from said stator.

Also a rotor may further comprise a turntable connected on a top end of the rotation shaft, and a magnet installed at a rotor yoke connected to an upper portion of the rotation shaft, the rotor rotating an optical disc mounted on the turntable by the rotation of the rotation shaft; a stator may further comprise a base plate installed on an outer circumferential surface of the bearing housing, and a stator core facing the magnet on the base plate.

The cap may have an outer diameter comprising a large diameter portion and a small diameter portion, and a first stepped part is formed on an inner circumferential surface of the bearing housing so that each of the large diameter portion and the small diameter portion of the cap is pressed into the inner circumferential surface of the bearing housing.

A second stepped part may be formed on an upper side of the first stepped part of the bearing housing, and the large diameter portion of the cap does not contact an upper inner surface of the second stepped part of the bearing housing.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described in detail by explaining exemplary embodiments of the invention with reference to the attached drawings.

Figure 1:
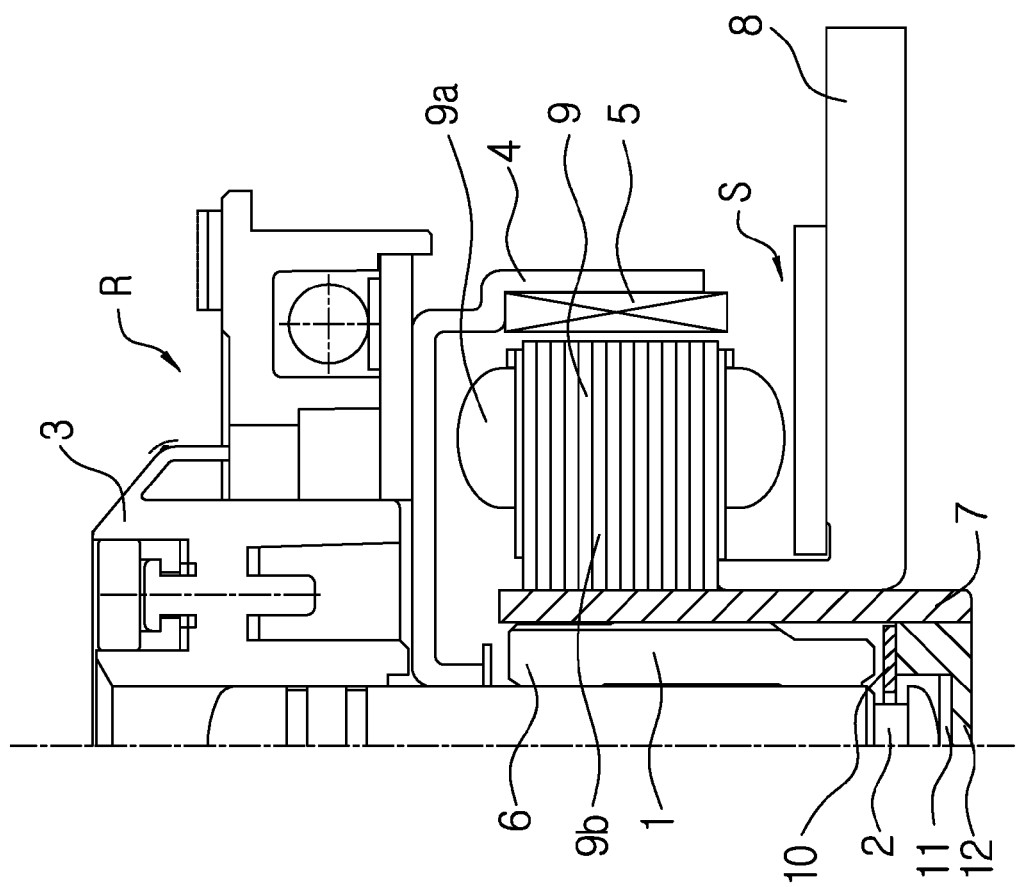
FIG. 1 is a half cross-sectional view of a spindle motor according to an embodiment of the present invention.

FIG. 1 is a half cross-sectional view of a spindle motor according to an embodiment of the present invention. (The left and right sides of the spindle motor are symmetrical with each other and thus, only the right side of the drawing is shown.)

Referring to FIG. 1, the spindle motor is a disc spindle motor which is used to rotate an optical disc, for example, a minidisc (MD). The spindle motor of FIG. 1 includes a rotor R, a stator S, a stop washer 10, and a cap 12.

The rotor R includes a rotation shaft 1 installed at a center of the rotor R, a turntable 3 having a hole being formed at a center of the turntable 3, which is fixed to the rotation shaft 1 by inserting the rotation shaft 1 into the hole, a rotor yoke 4 which is attached to an outer circumferential surface of the rotation shaft 1 that is placed below the turntable 3, and a magnet 5 installed and fixed on an inner circumference of one end of the rotor yoke 4. A reduced-diameter portion 2 having a smaller outer diameter than the rotation shaft 1 is formed on a bottom end of the rotation shaft 1. The turntable 4 may be driven by loading the optical disc, for example, by a magnetic force, and may be separated from the optical disc by ejecting the optical disc from the turntable 4.

The stator S includes a radial bearing 6 inserted in an outer circumferential surface of the rotation shaft 1, a bearing housing 7 that surrounds an outer circumferential surface of the radial bearing 6, a base plate 8 that is disposed under the outer circumferential surface of the bearing housing 7, a stator core 9 that is attached to a circumferential surface of the bearing housing 7 on the base plate 8 and faces the magnet 5 by a predetermined distance, and a thrust supporter 11 that supports a bottom end of the rotation shaft 1. The radial bearing 6 supports the rotation shaft 1 to be rotatable, and the stator core 9 is constituted so that an insulated core 9a is wound around a coil 9b.

The stop washer 10 engages the reduced-diameter portion 2 of the rotation shaft 1 of the rotor R, and a top end surface of the stop washer 10 is closely contacted to a bottom end surface of the radial bearing 6, and a top surface of the cap 12 is closely contacted to a bottom end surface of the stop washer 10 when a front end of the rotation shaft 1 and the thrust supporter 11 are accommodated in the cap 12. In this case, the cap 12 is pressed into from an upper portion of the bearing housing 7 and is closely contacted to a bottom end of the bearing housing 7. As such, a gap between the cap 12 and the bearing housing 7 is almost not existed. Here, the radial bearing 6 is pressed into the bearing housing 7 downward until the stop washer 10 and the cap 12 can be pressed by a bottom end of the radial bearing 6.

In this way, in the spindle motor according to the current embodiment, due to the stop washer 10 inserted in the small diameter portion 2 of the rotation shaft 1, the rotor R is prevented from escaping from the stator S, and simultaneously, the cap 12 is pressed into the bearing housing 7 and is closely attached thereto so that the cap 12 can be easily, closely attached to the bearing housing 7 without a gap between the cap 12 and the bearing housing 7 and leakage of oil through the bearing 6 can be prevented. In addition, a press fit force of the cap 12 itself and a press fit force of the radial bearing 6 act on the cap 12 so that the cap 12 can be prevented from being upwardly separated from the bearing housing 7.

Figure 2:
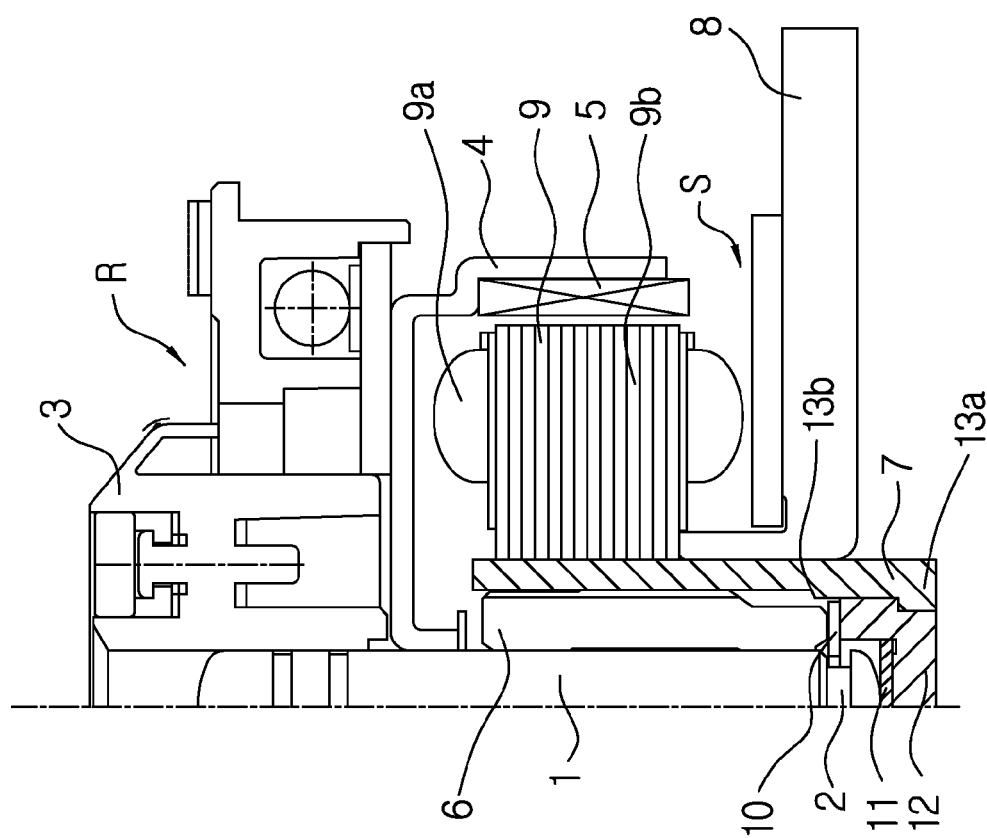
FIG. 2 is a half cross-sectional view of a spindle motor according to another embodiment of the present invention.
Figure 3:
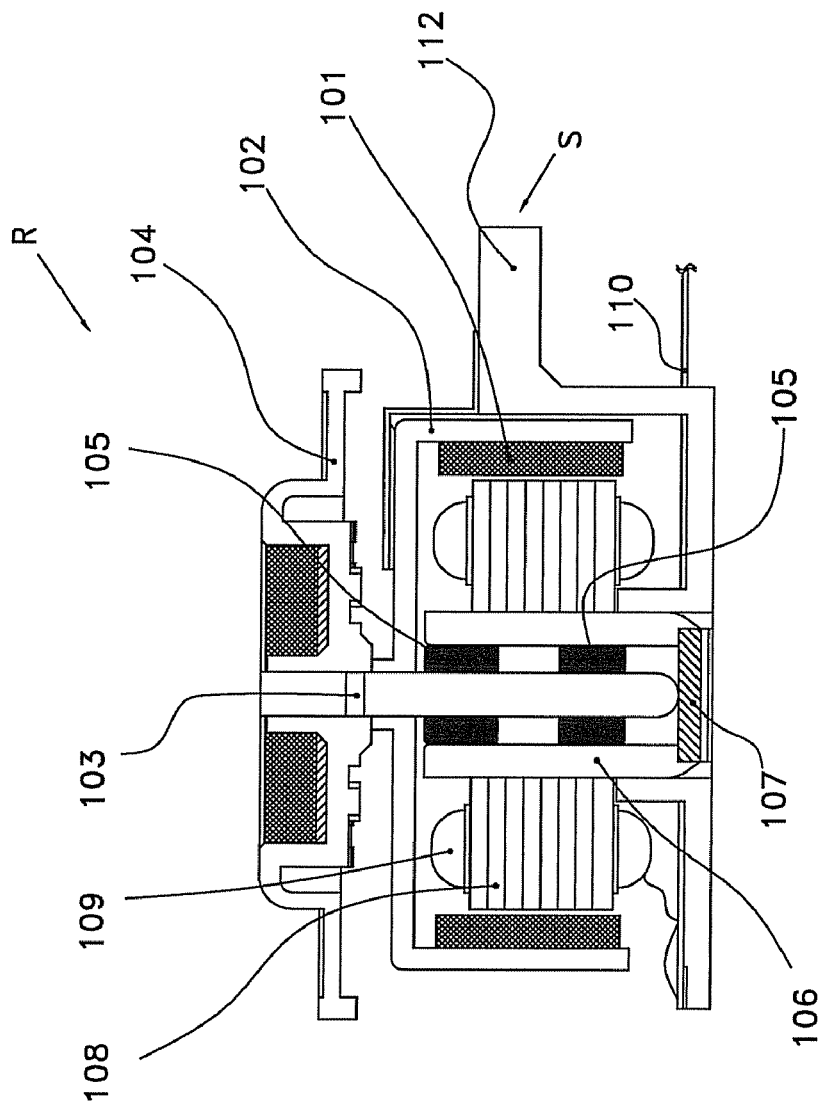
FIG. 3 is a cross-sectional view of a conventional spindle motor.
Figure 4:
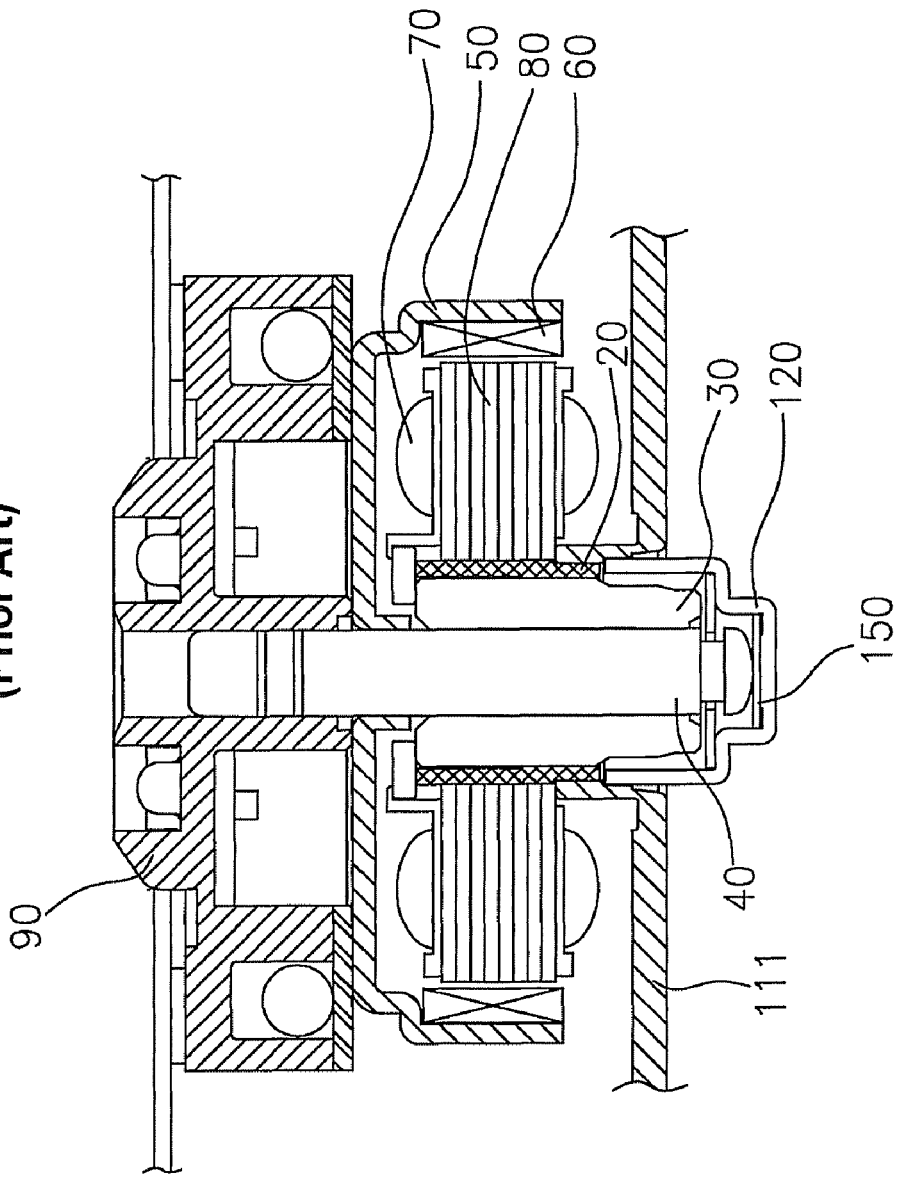
FIG. 4 is a cross-sectional view of another conventional spindle motor.

FIG. 2 is a half cross-sectional of a spindle motor according to another embodiment of the present invention. (The left and right sides of the spindle motor are symmetrical with each other and thus, only the right side of the drawing is shown.)

Referring to FIG. 2, most configuration and assembling method of FIG. 2 are the same as those of the spindle motor of FIG. 1. The only difference is that a cap 12 has an outer diameter including a large diameter portion and a small diameter portion, a first stepped part 13a is formed on an inner circumferential surface of a bearing housing 7 of a stator S to which the large diameter portion and the small diameter portion of the cap 12 are closely attached each other, a step portion that is formed on an outer circumferential surface of the cap 12 between the large diameter portion and the small diameter portion and a step portion that is formed on the inner circumferential surface of the bearing housing 7 are adjusted and are closely attached to the step portion of the cap 12 each other and a second stepped part 13b is formed on the upper side of the first stepped part 13a, i.e., on the inner circumferential surface of the bearing housing 7 that is disposed on the stop washer 10.

Due to the first stepped part 13a and the second stepped part 13b, the bearing housing 7 has different diameters. In other words, the bearing housing 7 has a largest inner diameter that contacts an outer diameter of a radial bearing 6, a medium-sized inner diameter that contacts the large diameter portion of the outer diameter of the cap 12, and a smallest inner diameter that contacts the small diameter portion of the outer diameter of the cap 12 in the top-view of the bearing housing 7.

Thus, the first stepped part 13a can prevent the cap 12 from being downwardly separated from the bearing housing 7 when a rotation shaft 1 escapes from the stator S downward due to a thrust attracting force that acts downward in the rotation shaft 1 when the spindle motor according to the current embodiment operates. In addition, due to the second stepped part 13*b*, when the cap 12 is pressed into the bearing housing 7, the large diameter portion of the outer diameter of the cap 12 does not contact the inner circumferential surface of the bearing housing 7 on the upper side of the second stepped part 13*b* so that a change of the largest inner diameter of the bearing housing 7 can be inhibited and damage of the largest inner circumferential surface of the bearing housing 7 can be prevented.

Here, with respect to a surface in which the cap 12 and the bearing housing 7 are closely attached to each other, a surface in which the bearing housing 7 is closely attached to an upper portion of the first stepped part 13*a*, i.e., to the large diameter portion of the outer diameter of the cap 12 becomes a press fit surface, and a surface in which the bearing housing 7 is closely attached to a lower portion of the first stepped part 13*a*, i.e., to the small diameter portion of the outer diameter of the cap 12 becomes an inserting surface.

Meanwhile, in FIGS. 1 and 2, the magnet 5 is disposed at the rotor R, and the stator core 9 is disposed at the stator S. However, the present invention is not limited thereto. The stator core 9 may be disposed at the rotor R, and the magnet 5 may be disposed at the stator S. In addition, the embodiments in which the present invention is applied to a recording/reproducing apparatus or reproducing apparatus of a magneto-optical recording medium of a magneto-optical disc, are shown. However, the present invention may be applied to a different type of an optical disc, for example, to a reproducing apparatus of a compact disc (CD).

In the spindle motor according to the present invention, the stop washer can prevent the rotor from escaping from the stator, and the cap is pressed into the bearing housing and is closely attached to the bearing housing so that the cap can be easily, closely attached to the bearing housing and a press fit force of the bearing and a press fit force of the cap can prevent the cap from being upwardly separated from the bearing housing and due to press, close contact, a gap between the cap and the bearing housing is not formed and leakage of oil can be prevented and quality of the spindle motor is improved.

In addition, the first stepped part formed between the cap and the bearing housing can prevent the cap from being downwardly separated from the bearing housing, and the second stepped part is formed on an inner circumferential surface of the bearing housing on the upper side of the first stepped part, and when the cap is pressed into the first stepped part from upward of the bearing housing, an inner circumferential surface of the bearing housing that is positioned on the second stepped part and an outer circumferential surface of the cap do not contact each other so that a change of an inner diameter of the bearing housing can be inhibited, damage of the inner circumferential surface of the bearing housing can be prevented and quality of the spindle motor is further improved.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A spindle motor comprising:
   a rotor comprising a rotation shaft which includes a reduced-diameter portion formed on an end of the rotation shaft being located at a center of said rotor, a turntable connected on a top end of the rotation shaft, and a magnet installed at a rotor yoke connected to an upper portion of the rotation shaft, said rotor rotating an optical disc mounted on the turntable by the rotation of the rotation shaft;
   a stator supporting said rotor to be rotatable by the rotation shaft of said rotor, said stator comprising:
      a radial bearing,
      a bearing housing having a cylindrical shape comprising an upper portion sequentially surrounding an outer circumferential surface of the rotation shaft and holding a stator core facing the magnet on a base plate, and a lower portion, the base plate being installed on an outer circumferential surface of the bearing housing, and
      a thrust supporter supporting a bottom end of the rotation shaft;
   a cap connected to the lower portion by being inserted in the upper portion of the bearing housing and pressed into the lower portion of the bearing housing, sealing the lower portion of the bearing housing, the thrust supporter being disposed at a bottom of the cap; and
   a stop washer disposed between the thrust supporter and the bearing and engaging the reduced-diameter, portion of the rotation shaft of said rotor, of which top surface is closely contacted to a bottom surface of the bearing and of which bottom surface is closely contacted to a top surface of said cap so that the rotation shaft of said rotor inserted in said stator does not escape from said stator.

2. The spindle motor of claim 1, wherein:
   the lower portion of said bearing housing comprises an inner circumferential surface comprising:
      a large part having an inner diameter smaller than an inner diameter of the upper portion of the bearing housing,
      a small part under the large part having an inner diameter smaller than the inner diameter of the large part, and
      a first stepped part between the large part and the small part,
   said cap has an outer diameter comprising:
      a large diameter portion,
      a small diameter portion, and
      a stepped part between the large diameter portion and the small diameter portion, and
   the stepped part of said cap is closely contacted to the first stepped part of said bearing housing so that each of the large diameter portion and the small diameter portion of said cap is pressed into the inner circumferential surface of the lower portion of the bearing housing.

3. The spindle motor of claim 2, wherein a second stepped part is formed on an upper side of the first stepped part of the bearing housing, and the large diameter portion of said cap does not contact an upper inner surface of the second stepped part of the bearing housing.

4. A spindle motor comprising:
   a rotor comprising a rotation shaft which includes a reduced-diameter portion formed on an end of the rotation shaft being located at a center of said rotor;
   a stator supporting said rotor to be rotatable with the rotation shaft, said stator comprising:
      a radial bearing supporting the rotation shaft,
      a bearing housing having a cylindrical shape comprising of an upper portion surrounding the radial bearing and holding a stator core, and a lower portion, and
      a thrust supporter supporting a bottom end of the rotation shaft;
   a cap having an outer diameter slightly larger than an inner diameter of the lower portion of the bearing housing prior to assembly such that when the cap is inserted in the upper portion of the bearing housing and pressed until it reaches the lower portion, the cap is press-fitted into the lower portion of the bearing housing, the thrust supporter being disposed at a bottom of the cap; and a stop washer disposed between the thrust supporter and the bearing and engaging the reduced-diameter portion of the rotation shaft of said rotor, of which top surface is closely contacted to a bottom surface of the bearing and of which bottom surface is closely contacted to a top surface of said cap so that the rotation shaft of said rotor inserted in said stator does not escape from said stator.

5. The spindle motor of claim 4, wherein:

the lower portion of said bearing housing has an inner circumferential surface comprising a large part having an inner diameter smaller than an inner diameter of the upper portion of the bearing housing, a small part under the large part having an inner diameter smaller that the inner diameter of the large part, and a first stepped part between the large part and the small part, said cap has an outer diameter comprising:

a large diameter portion, a small diameter portion, and a stepped part between the large diameter portion and the small diameter portion, and the stepped part of said cap is closely contacted to the first stepped part of said bearing housing, so that each of the large diameter portion and the small diameter portion of said cap is pressed into the inner circumferential surface of the lower portion of the bearing housing.

6. The spindle motor of claim 5, wherein a second stepped part is formed on an upper side of the first stepped part of the bearing housing, and the large diameter portion of said cap does not contact an upper inner surface of the second stepped part of the bearing housing.

* * * * *